US008849608B2

(12) United States Patent
Scholes et al.

(10) Patent No.: US 8,849,608 B2
(45) Date of Patent: Sep. 30, 2014

(54) INTRUSION DETECTION SYSTEM

(75) Inventors: Dallas Steven Scholes, Buckley, WA (US); Eric Paul Oman, Lake Saint Louis, MO (US)

(73) Assignee: The Boeing Company, Chicago, IL (US)

(*) Notice: Subject to any disclaimer, the term of this patent is extended or adjusted under 35 U.S.C. 154(b) by 444 days.

(21) Appl. No.: 13/286,925

(22) Filed: Nov. 1, 2011

(65) Prior Publication Data
US 2013/0110455 A1 May 2, 2013

(51) Int. Cl.
*G06F 15/00* (2006.01)
*G01S 13/04* (2006.01)
*G01S 17/02* (2006.01)
*G08B 13/196* (2006.01)

(52) U.S. Cl.
CPC ......... *G01S 17/026* (2013.01); *G08B 13/19602* (2013.01); *G01S 13/04* (2013.01)
USPC ........................ 702/150; 340/540; 340/572.4

(58) Field of Classification Search
CPC ....... G01S 13/04; G01S 17/026; G01S 13/93; G01S 2013/916; G01S 7/003; G08B 13/19602; G01N 2021/7709; G01N 2021/7786; G01N 2021/7796; G01N 21/7703; G01N 2201/0826; G08G 5/04
USPC ......... 702/115, 134, 144, 150, 158, 159, 172, 702/183, 188, 189, 94, 95; 324/632, 324/754.31; 340/539.1, 540, 572.4, 572.6; 701/2
See application file for complete search history.

(56) References Cited

U.S. PATENT DOCUMENTS 7,319,397 B2   1/2008 Chung et al.
7,733,220 B2   6/2010 Libby
7,764,172 B1 * 7/2010 Parrish .......................... 340/540

OTHER PUBLICATIONS

Ginger, "The Ground Sensor Platoon, The Marine Corps' unknown collection asset," Marine Corps Gazette, Jul. 2010, 2 pages, accessed Aug. 31, 2011 http://www.mca-marines.org/gazette/article/ground-sensor-platoon.
"White Papers— Trident's Family of Unattended Ground Sensors," Trident Technology Systems, Trident Systems Incorporated, 13 pages, accessed Aug. 31, 2011 http://www.tridsys.com/white-unattended-ground-sensors.htm.
PCT search report dated Dec. 6, 2012 regarding application PCT/US2012/058354, Applicant The Boeing Company, 11 pages.
International Preliminary Report on Patentability and Written Opinion dated May 6, 2014 regarding application PCT/US2012/058354, 7 pages.

* cited by examiner

Primary Examiner — John H Le
(74) Attorney, Agent, or Firm — Yee & Associates, P.C.

(57) ABSTRACT

A method and apparatus for surveillance. A signal is sent to sensors on a ground in an area. The sensors are configured to generate electromagnetic radiation in response to the signal to activate the sensors. The current positions of the sensors are detected from the electromagnetic radiation generated by the sensors in response to the signal.

27 Claims, 11 Drawing Sheets

FIG. 15
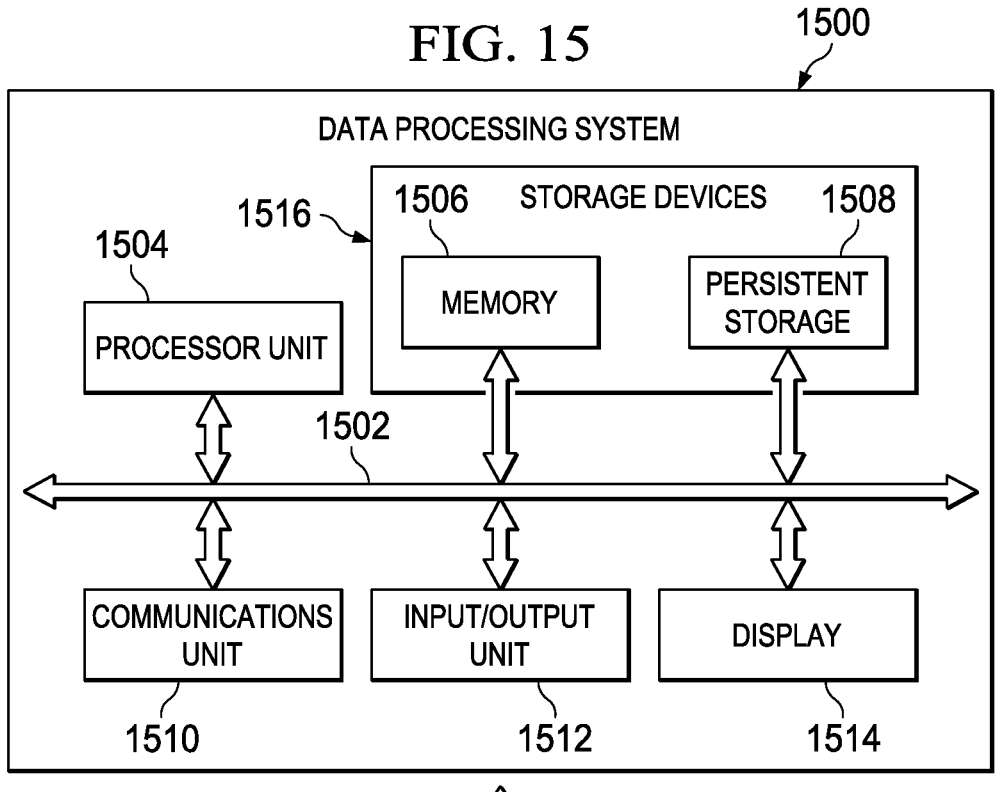
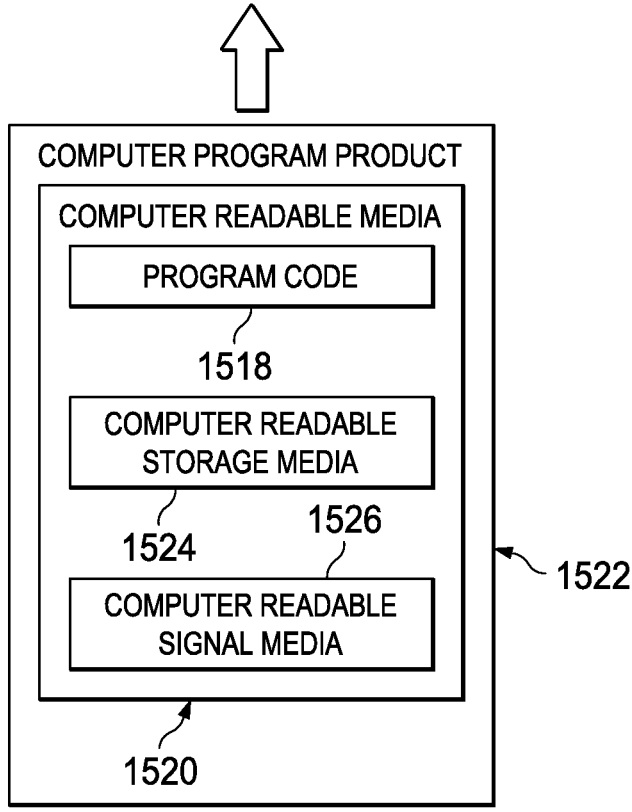

INTRUSION DETECTION SYSTEM

BACKGROUND INFORMATION

1. Field

The present disclosure relates generally to surveillance and, in particular, to a method and apparatus for detecting intrusions in an area on the ground.

2. Background

Devices, such as improvised explosive devices (IEDs), have been used in many different areas. These types of devices are typically placed in locations where traffic is expected. For example, these devices may be buried under the ground, on the road, along a path, or in other areas.

For example, if a device is buried under or along a road, the device is likely to be undetectable to vehicles and pedestrians travelling in these area. These types of devices may damage vehicles and their occupants and may injure pedestrians.

Personnel from around the world have developed procedures to render these devices safe and to dispose of them once the devices are found. Various techniques are present for detecting improvised explosive devices. For example, visual signs may be used to detect the presence of an improvised explosive device. For example, without limitation, recently overturned soil or sand by a road, an abandoned vehicle by the road, or other signs may be used to indicate that such a device may be present.

Surveillance of an area also may provide indications that unauthorized persons have placed an improvised explosive device in an area. This surveillance may be performed using a video camera system in the area, a satellite, or some other suitable monitoring system. Other systems include using canines, metal detectors, infrared detectors, and other suitable mechanisms.

Although many current techniques are present for detecting these types of devices, the current techniques may not provide as accurate detection as desired. In other cases, the techniques may be more manpower-intensive or costly than desired.

Therefore, it would be advantageous to have a method and apparatus that takes into account at least some of the issues discussed above as well as possibly other issues.

SUMMARY

In one advantageous embodiment, a method is present for surveillance. A signal is sent to sensors on a ground in an area. The sensors are configured to generate electromagnetic radiation in response to the signal to activate the sensors. Current positions of the sensors are detected from the electromagnetic radiation generated by the sensors in response to the signal.

In another advantageous embodiment, a sensor system comprises a signal generator, sensors, and an information detector. The signal generator is configured to generate a signal. The sensors are configured for placement on a ground in an area. The sensors are configured to generate electromagnetic radiation in response to the signal. The information detector is configured to collect information about current positions of the sensors using the electromagnetic radiation.

In yet another advantageous embodiment, a sensor system comprises a structure and a controller. The structure is associated with a material. The material is configured to generate electromagnetic radiation using energy from a first signal at a first frequency in response to the material receiving the first signal. The controller is configured to receive a second signal at a second frequency and generate the first signal in response to receiving the second signal.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 15 is an illustration of a data processing system in accordance with an advantageous embodiment.

DETAILED DESCRIPTION

The different advantageous embodiments recognize and take into account one or more considerations. For example, the different advantageous embodiments recognize and take into account that currently used systems for detecting devices, such as improvised explosive devices, rely on physically identifying the devices themselves. The different advantageous embodiments recognize and take into account that existing techniques employ personnel that operate optical equipment, infrared systems, and other devices to detect displacement of the ground or movement of people.

Further, the different advantageous embodiments also recognize and take into account that current systems may use mechanical implements to search or disturb the soil in an area to locate or detonate a device. Optical surveillance systems, acoustic surveillance systems, optical beams, infrared light beams, acoustical measuring devices, and other devices may be used to detect the passage of personnel through a particular section or area. These detection devices, however, are constrained in the amount of area that can be monitored.

Further, the different advantageous embodiments also recognize and take into account that these types of detection devices are more easily detectable than desired. As a result, people performing undesired activities, such as deploying improvised explosive devices, may be able to avoid or hide their activities.

The different advantageous embodiments recognize and take into account that currently available satellite and unmanned aerial vehicles may not be able to detect movement or changes in an area for the desired persistent length of time.

Thus, one or more of the different advantageous embodiments provide a method and apparatus for detecting intrusions in an environment. In one advantageous embodiment, a method is present for surveillance. The method comprises deploying sensors in an area. The sensors are configured to generate information in the form of electromagnetic radiation in response to a signal to activate the sensors. The signal is sent to the sensors. A current position of the sensors is detected from the electromagnetic radiation generated by the sensors in response to the signal. The current position of the sensors may be used to determine whether an intrusion has occurred in the area. This electromagnetic radiation may be light and, in particular, may be non-visible light.

Figure 1:
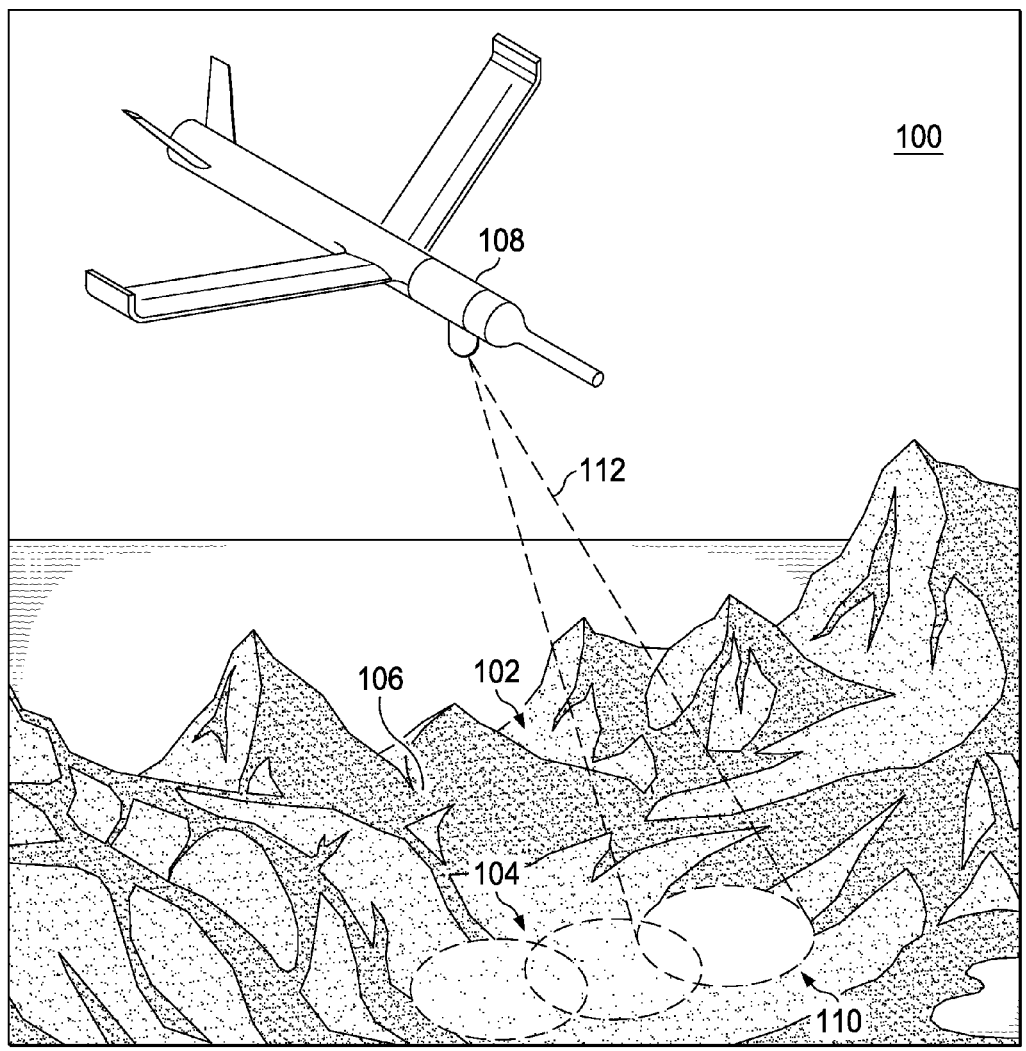
FIG. 1 is an illustration of an intrusion detection environment in accordance with an advantageous embodiment.

Turning first to FIG. 1, an illustration of an intrusion detection environment is depicted in accordance with an advantageous embodiment. In this illustrative example, an intrusion detection environment 100 is an environment in which movement of personnel or disturbance of the ground may be detected.

As illustrated, an area 102 in the intrusion detection environment 100 may have sensors 104 deployed on the ground 106 in the area 102. Each of the sensors 104 may have a size that is not easily detectable by pedestrians or vehicle occupants that are traveling across the ground 106.

As depicted, the sensors 104 are configured to generate light 110 in response to a signal 112 sent from an aircraft 108. The signal 112 has a specific frequency that causes the sensors 104 to generate the light 110. In response to detecting the signal 112 with this particular frequency, the sensors 104 generate the light 110.

Further, in these illustrative examples, the light 110 generated by the sensors 104 may be of a wavelength that is not visible to a human eye. In this manner, personnel on the ground 106 may not be able to detect the sensors 104 when the sensors 104 are generating the light 110.

In this illustrative example, the signal 112 is directed towards the sensors 104 just after the sensors 104 have been deployed on the ground 106 in the area 102. The aircraft 108 detects the sensors 104 from the light 110 emitted by the sensors 104 to obtain information about the sensors 104. The aircraft may generate images or other information based on the light 110 emitted by the sensors 104.

In particular, the light 110 may have a pattern based on the current positions of the sensors 104 on the ground 106 in the area 102. With the information, the current positions of the sensors 104 may be identified. These current positions may be used for comparison at a later time. In other words, the current positions may form a baseline.

Figure 2:
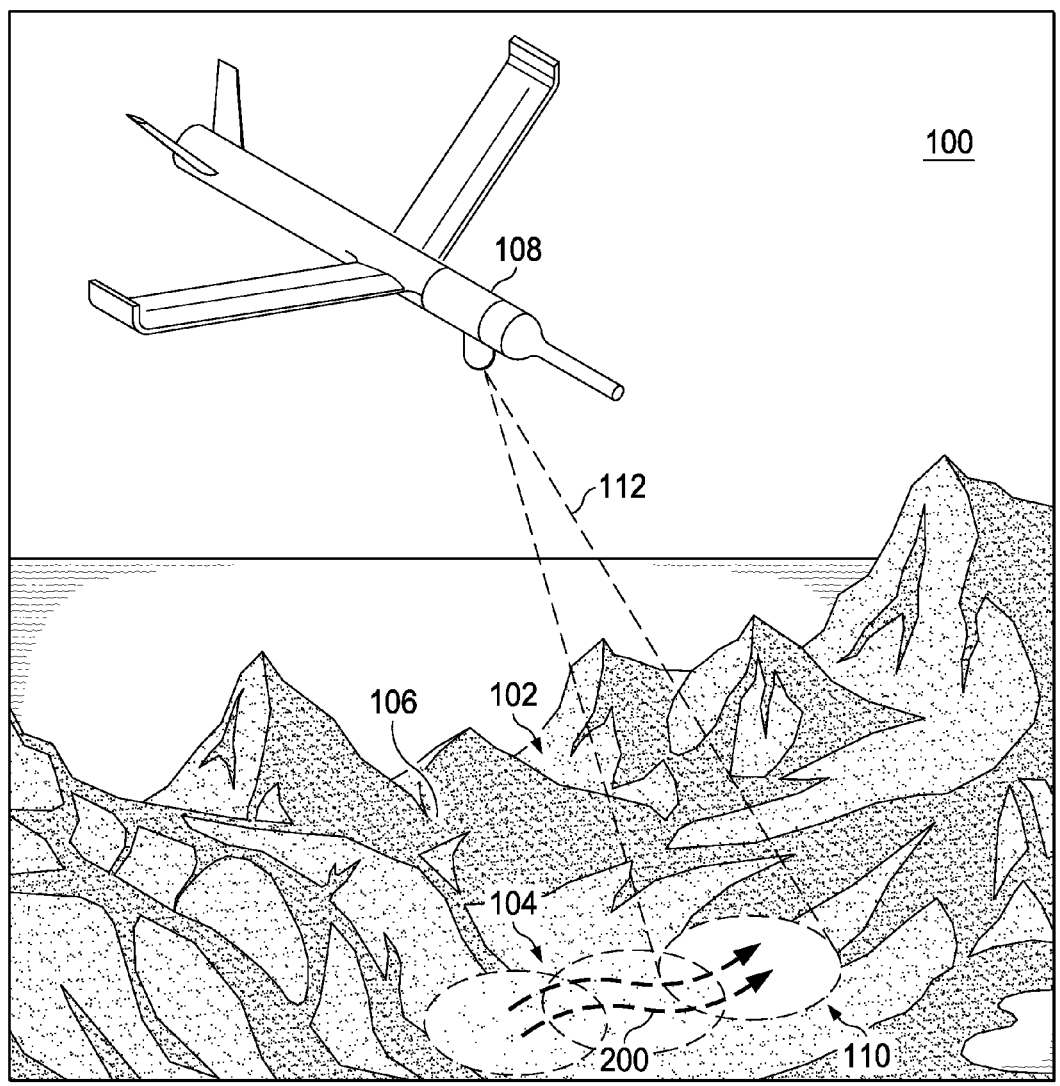
FIG. 2 is an illustration of movement of sensors on the ground in an area in accordance with an advantageous embodiment.

With reference now to FIG. 2, an illustration of movement of the sensors 104 on the ground 106 in the area 102 is depicted in accordance with an advantageous embodiment. Movement of objects through the area 102 changes the current positions of the sensors 104. These objects may be, for example, without limitation, people, vehicles, a living organism, a disturbance of the ground, and other objects.

When movement of objects changes the positions of at least some of the sensors 104, the pattern of the light 110 generated by the sensors 104 also changes. Further, disturbance of the ground 106 also may result in a change in the pattern of light 110 on the ground 106. For example, burying an object in the ground 106, digging a trench in the ground 106, or some other action may cause at least some of the sensors 104 to move.

In this illustrative example, the aircraft 108 generates the signal 112 at a later time from when the baseline was identified. The sensors 104 generate information in the form of light 110. The aircraft 108 detects the light 110 and generates images of the sensors 104 emitting the light 110. The current positions of the sensors 104 are identified from the images.

A determination may be made as to whether a change in the current positions of the sensors 104 occurs between the different times. In this illustrative example, the current positions identified for the sensors 104 are compared to the positions in the baseline created at a prior time.

In this particular example, an intrusion is identified from tracks 200. Tracks 200 are a result of one or more objects moving on the ground 106 through the area 102. In this manner, a change in the current positions of the sensors 104 may indicate that an intrusion has occurred in the area 102.

Figure 3:
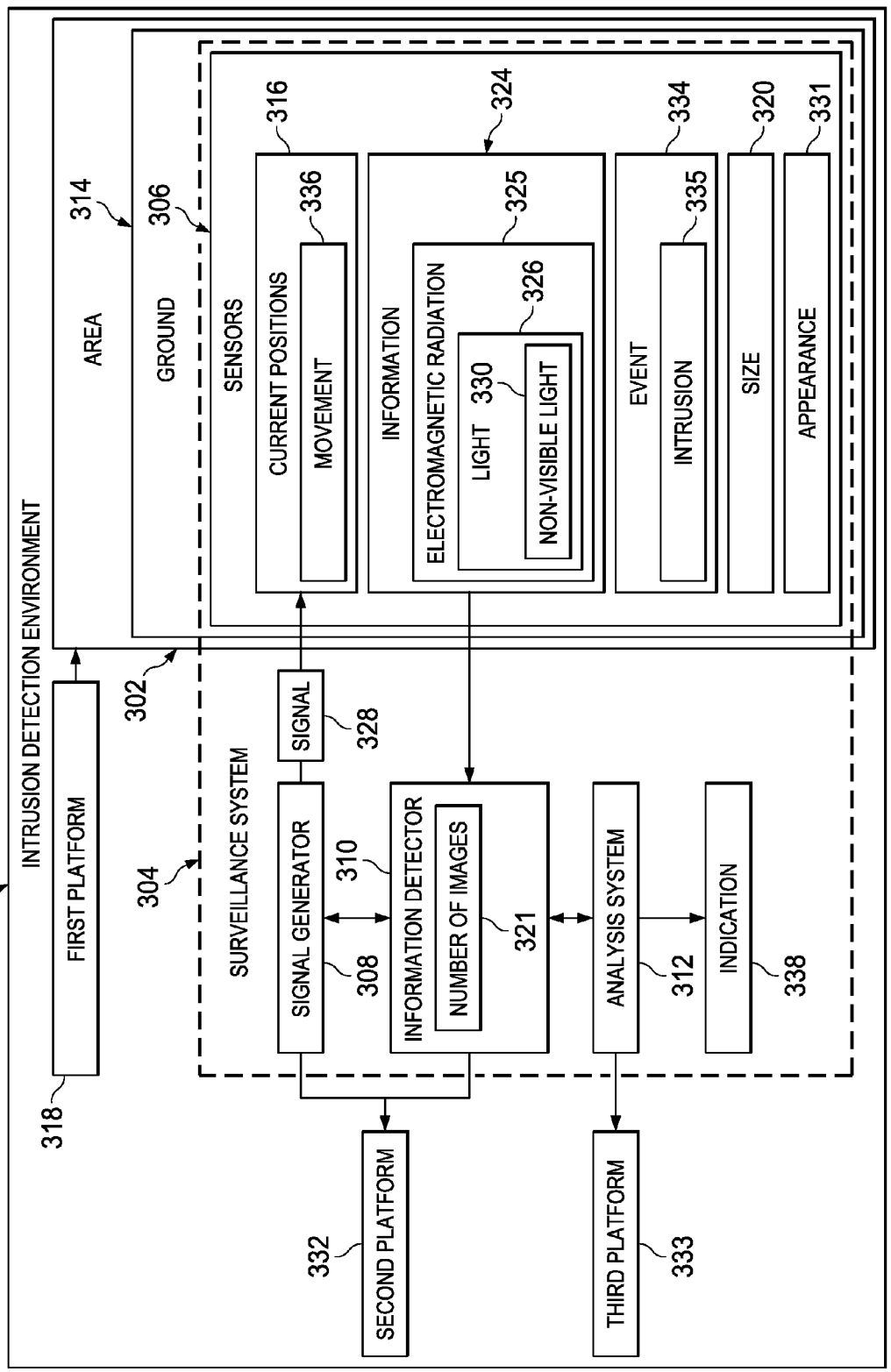
FIG. 3 is an illustration of a block diagram of an intrusion detection environment in accordance with an advantageous embodiment.

Turning now to FIG. 3, an illustration of a block diagram of an intrusion detection environment is depicted in accordance with an advantageous embodiment. In this illustrative example, the intrusion detection environment 100 illustrated in FIG. 1 is an example of one implementation for the intrusion detection environment 300 depicted in block form in FIG. 3.

In this illustrative example, an area 302 in the intrusion detection environment 300 may be monitored using a surveillance system 304. The surveillance system 304 includes sensors 306, a signal generator 308, an information detector 310, and analysis system 312.

The sensors 306 are placed on the ground 314 in the area 302. In these illustrative examples, the sensors 306 on the ground 314 have current positions 316.

In these illustrative examples, the sensors 306 may be deployed using a first platform 318. The first platform 318 may take various forms. For example, the first platform 318 may be a stationary platform or a mobile platform. When the first platform 318 is a stationary platform, the first platform 318 may be, for example, without limitation, a tower or some other structure from which the sensors 306 may be deployed in the area 302. In one illustrative embodiment, the sensors 306 may be deployed on a number of stationary platforms or a number of mobile platforms.

When the first platform 318 takes the form of a mobile platform, the first platform 318 may be, for example, without limitation, an aircraft, a ground vehicle, a person, or some other suitable object that is configured to deploy the sensors 306 on the ground 314 in the area 302.

The sensors 306 may be randomly placed without needing any particular pattern or order. The placement of the sensors 306 is performed such that movement through the area 302 may cause a disturbance of the sensors 306. In other words, the current positions 316 of the sensors 306 may change if movement through the area 302 has occurred.

In other words, a density of the sensors 306 may be selected such that movement of people, vehicles, and/or other objects moves some of the sensors 306 along the path of movement.

This movement of the sensors 306 may include a change in the location, orientation, or both the location and orientation of at least some of the sensors 306. In other words, the density may be selected such that an object moving in the area 302 is unable to avoid the sensors 306 on the ground 314.

In these illustrative examples, the sensors 306 have a size 320, an appearance 331, or some combination thereof that makes the sensors 306 more difficult to identify as being sensors 306. The appearance 331 may include at least one of a shape, a color, a texture, and other parameters that contribute to the appearance 331 of the sensors 306. In particular, the size 320 and the appearance 331 may be such that a person traveling through the area 302 would not recognize a presence of the sensors 306.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Also, the size 320, the appearance 331, or both for the sensors 306 may be such that the sensors 306 can be disturbed when a person, vehicle, or other object moves through the area 302. Also, the sensors 306 may be disturbed by a person burying objects in the ground 314.

As depicted, the sensors 306 are configured to generate information 324. In particular, the sensors 306 are configured to generate the information 324 in response to receiving a signal 328 generated by the signal generator 308. The signal generator 308 is hardware and may include software. For example, the signal generator 308 may be implemented using a transmitter and an antenna system.

The signal generator 308 may be located on a second platform 332. The second platform 332 may be a stationary or a mobile platform. When the second platform 332 is a stationary platform, the second platform 332 may be tower, a light pole, a tree, a wall, or some other suitable structure. When the second platform 332 is a mobile platform, the second platform 332 may be, for example, an aircraft, a ground vehicle, a person, an unmanned aerial vehicle, a satellite, or some other suitable platform.

The signal 328 generated by the signal generator 308 may be, for example, without limitation, a radio frequency signal, an infrared signal, an electromagnetic frequency signal, or some other suitable type of signal that causes the sensors 306 to generate the information 324.

In response to receiving the signal 328, the sensors 306 generate the information 324 that is detected by the information detector 310. The information detector 310 also may be located on the second platform 332. Information detector 310 is hardware and may also include software. In these illustrative examples, the information detector 310 may comprise at least one of a camera, an infrared light detector, or some other suitable type of sensor. In other illustrative examples, the information detector 310 may also be located on a different platform than the second platform 332.

As depicted, the information 324 takes the form of electromagnetic radiation 325. In the illustrative examples, the electromagnetic radiation 325 may take the form of light 326. In particular, the light 326 may be in the form of non-visible light 330.

When the information 324 is generated by the sensors 306, the information 324 is detected by the information detector 310. The information detector 310 generates a number of images 321 of light 326 from the sensors 306. As used herein, a "number", when used with reference to items, means one or more items. For example, a "number of images 321" is one or more images.

The number of images 321 may be sent to the analysis system 312 by the information detector 310. The analysis system 312 is hardware and also may include software in these examples.

In this example, the analysis system 312 is located on a third platform 333. The third platform 333 may be a stationary platform or a mobile platform. When the third platform 333 is a stationary platform, the third platform 333 may be, for example, a building, tower, or some other stationary structure. When the third platform 333 is a mobile platform, the third platform 333 may be, for example, an aircraft, a ship, a submarine, a truck, a person, or some other suitable object.

The number of images 321 is used by the analysis system 312 to identify positions of the sensors 306. The analysis system 312 analyzes the positions of the sensors 306 identified from the number of images 321 to determine whether an event 334 has occurred in the area 302. In these illustrative examples, an event 334 means that an intrusion 335 may have occurred. The event 334 may be based on a movement 336 in the current positions 316 of the sensors 306 as compared to prior positions for the sensors 306. If the analysis system 312 detects that an event 334 is present, the analysis system 312 generates an indication 338.

The indication 338 may take various forms. For example, the indication 338 may be at least one of an audible alert, an email message, a report, and other suitable types of indications.

When the indication 338 is generated, actions may be taken. For example, a search may be made in a position in the area 302 for an improvised explosive device, movements of undesired persons may be predicted, and other suitable actions may be taken.

The illustration of intrusion detection environment 300 in FIG. 3 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, the signal generator 308 and the information detector 310 may be located on different platforms. In one illustrative example, the signal generator 308 may be located on an unmanned aerial vehicle, while the information detector 310 may be located on a satellite. In yet other illustrative examples, the information 324 generated by the sensors 306 may include more than the light 326. For example, the sensors 306 also may generate radio frequency signals that include additional information. For example, the radio frequency signals may include identifiers for the sensors 306 and coordinates identifying the current positions 316 of the sensors 306.

In still another illustrative example, the information detector 310 may identify the current positions 316 of the sensors 306. The information detector 310 may send the current positions 316 of the sensors 306 to the analysis system 312 instead of sending the number of images 321 to the analysis system 312.

Further, the presence of the event 334 also may be based on some of the sensors 306 being covered by objects. For example, when detecting the current positions 316 of the sensors 306, the information 324 about the absence of the sensors 306 may also be valuable. In some cases, the sensors 306 may be covered by objects that are placed around, near, or on top of the sensors 306.

For example, when an object, such as a vehicle, covers a portion of the sensors 306, the part of the area 302 covered by the vehicle appears to have no sensors 306. Similarly, when sensors 306 are pushed underground after the burial of an improvised explosive device, the area 302 where the ground 314 was disturbed will appear to have fewer or no sensors 306. Other objects, such as a person, falling vegetation, or dirt also may cover a portion of the sensors 306.

Further, if the second platform 332 is a stationary platform, the placement of the information detector 310 on the second platform 332 relative to the sensors 306 may have a line of site that is blocked by an object. This situation results in the information detector 310 not detecting some or all of the sensors 306 in the area 302. This information provides the analysis system 312 with information about the location and orientation of new objects in the area 302 that may have entered the area 302 after the prior image was generated.

In yet another illustrative example, the movement 336 of the sensors 306 may result in a portion of the sensors 306 moving out of the area 302 into a new area. Taking this type of movement into account, the second platform 332 with the signal generator 308 and the information detector 310 may travel into areas beyond the area 302 to determine whether any of the sensors 306 are present in those other areas. For example, the sensors 306 may contain a coating or other material that allows the sensors 306 to travel with the objects that move through the area 302. This coating may be, for example, an adhesive coating, a coating that contains burrs that may adhere to fabric, or other suitable material.

The identification of some of the sensors 306 that travel with the objects into other areas may be useful to indicate a direction of movement of objects that moved through the area 302. The supplemental identification of the position of the sensors 306 that have attached to objects that moved through the area 302 into other areas may provide additional tracking data for those objects. Further, the identification of the sensors 306 that become stationary in a new area after a period of movement out of the area 302 may also be useful in tracking objects or people.

Figure 4:
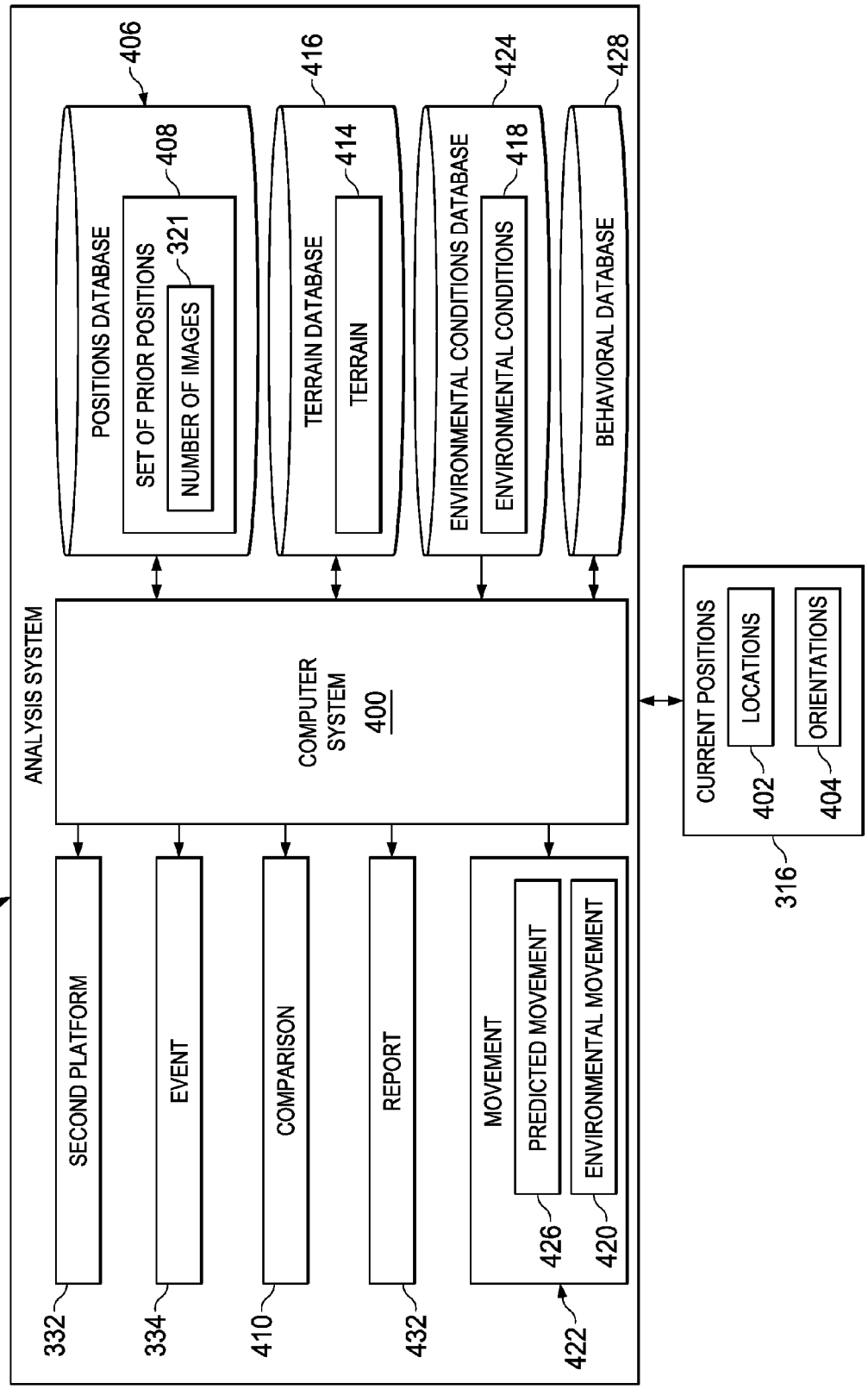
FIG. 4 is an illustration of a block diagram of an analysis system in accordance with an advantageous embodiment.

Turning now to FIG. 4, an illustration of a block diagram of the analysis system 312 in FIG. 3 is depicted in accordance with an advantageous embodiment. In this illustrative example, the analysis system 312 may be implemented using a computer system 400. The computer system 400 comprises one or more computers. When more than one computer is present in the computer system 400, those computers may be in communication with each other. This communication may be provided through a wireless communications link, a network, a shared memory, or some other suitable mechanism.

As illustrated, the analysis system 312 receives the information 324 detected by the information detector 310 in FIG. 3. In these examples, the information 324 is received in the number of images 321.

From the number of images 321, the analysis system 312 identifies the current positions 316 for the sensors 306 in FIG. 3. The current positions 316 include locations 402 for the sensors 306 on the ground 314. The locations 402 may be identified using any suitable coordinate system. For example, latitude and longitude may be used for the locations 402. Additionally, depending on the configuration of the sensors 306, the information 324 also may be used to identify the orientations 404 for the sensors 306.

The current positions 316 may be stored in a positions database 406. In these illustrative examples, the current positions 316 may be stored as information containing coordinates for the current positions 316 of the sensors 306. In other illustrative examples, the current positions 316 may be stored as the number of images 321 in the positions database 406. With the number of images 321, the coordinates for the current positions 316 may be identified at a later time.

In these illustrative examples, the analysis system 312 compares the current positions 316 with a set of prior positions 408 for the sensors 306 in the area 302. This process may be performed to determine whether the event 334 has occurred in the area 302. The comparing of the current positions 316 with the set of prior positions 408 may be performed using various processes. For example, the analysis system 312 may incorporate at least one of pattern recognition processes, statistical analysis, behavioral analysis, simulations, and other suitable processes. As used herein, a "set", when used with reference to items, means one or more items. For example, the "set of prior positions 408" is one or more prior positions for the sensors 306.

In these illustrative examples, the comparison of the current positions 316 to the set of prior positions 408 forms a comparison 410. Positions from each of the set of prior positions 408 may have been obtained at different times from positions of the current positions 316. The comparison 410 includes differences between the current positions 316 and the set of prior positions 408. These differences are used to identify a movement 422 of the sensors 306.

The movement 422 of the sensors 306 may be adjusted to remove movement that is not caused by objects moving through the area 302. In particular, the movement 422 may be adjusted by the analysis system 312 to remove movement from sources other than vehicles and people. A determination may be made as to whether an event 334 has occurred using the comparison 410 after the adjustment for other factors is made.

In adjusting the movement 422 for the comparison 410, the analysis system 312 may identify the terrain 414 for the area 302 from a terrain database 416. In the illustrative examples, the terrain database 416 may include naturally occurring features, man-made features, or a combination of the two. For example, the terrain database 416 may include at least one of contours in the ground 314, vegetation, roadways, parking lots, fields, buildings, streams, trees, and other features.

Further, the analysis system 312 may use environmental conditions 418 from an environmental conditions database 424. In these illustrative examples, the environmental conditions 418 are conditions present during times at which the current positions 316 and the set of prior positions 408 are identified. The number of environmental conditions that may effect movement of the sensors 306 may include at least one of wind speed, wind direction, humidity, snow, rainfall, the freezing and thawing of terrain, and other suitable environmental conditions.

With the terrain 414 and the environmental conditions 418 for the area 302, the analysis system 312 identifies the environmental movement 420 of the sensors 306 that may have occurred due to the environmental conditions 418 and the terrain 414.

For example, the wind and a hill in the terrain 414 may be used to take into account the environmental movement 420 of the sensors 306 caused by the wind. This type of movement of the sensors 306 is not considered to be an event 334 in these examples.

The analysis system 312 may adjust the movement 422 to take into account the environmental movement 420. In other words, the portion of the movement 422 caused by the environmental movement 420 may be removed from the movement 422.

Additionally, the analysis system 312 also may identify a predicted movement 426 using a behavioral database 428. The behavioral database 428 is a database of movement that may be expected from other sources other than the environmental conditions 418. In these illustrative examples, the behavioral database 428 may include traffic patterns for vehicles, people, and other objects, or the expected movement of people, vehicles, or disturbances of the ground.

In these illustrative examples, the behavioral database 428 may include an identification of traffic flow over the terrain 414 for the area 302.

In these illustrative examples, this analysis may be performed by using the environmental movement 420 and predicted movement 426 to adjust the movement 422. For example, a sensor in the sensors 306 is configured to move in a selected manner in response to an environmental condition. With this adjustment, only portions of the movement 422 may be left to indicate the presence of the event 334. In other words, by taking into account the terrain 414, the environmental conditions 418, and the predicted movement 426, the analysis system 312 is capable of identifying any remaining movement in the movement 422 from the comparison 410. In other words, the analysis system 312 determines whether any movement in the movement 422 is not consistent with movement of the sensors 306 that may occur in response to the environmental conditions 418, the predicted movement 426, or a combination of the two. An inconsistency means that the event 334 has occurred, indicating that an intrusion 335 may have occurred in the area 302.

When the event 334 is identified, the analysis system 312 may generate the indication 338 from FIG. 3. In these illustrative examples, the indication 338 may take the form of a report 432. This report 432 may include information such as movement direction, the certainty of the identification of the intrusion 335, an identification of the type of the intrusion 335, a location of the intrusion 335, and other suitable information. For example, the intrusion 335 may be caused by objects such as people, ground vehicles, or other mobile objects. The intrusion 335 also may take the form of an object buried in the ground 314 in the area 302. In these illustrative examples, activities performed to bury the object in the ground 314 causes movement 422 of the sensors 306.

The report 432 may be generated even though the event 334 is not detected. The movement 422 of the sensors 306 may be used to obtain a status of the coverage provided by the sensors 306. The report 432 may be used to determine whether additional sensors should be placed on the ground 314 with the sensors 306. The report 432 also may be used to determine if some of the sensors 306 have stopped functioning as desired. This information in report 432 may be used to determine whether to add additional replacement sensors to the sensors 306 in the area 302.

Figure 5:
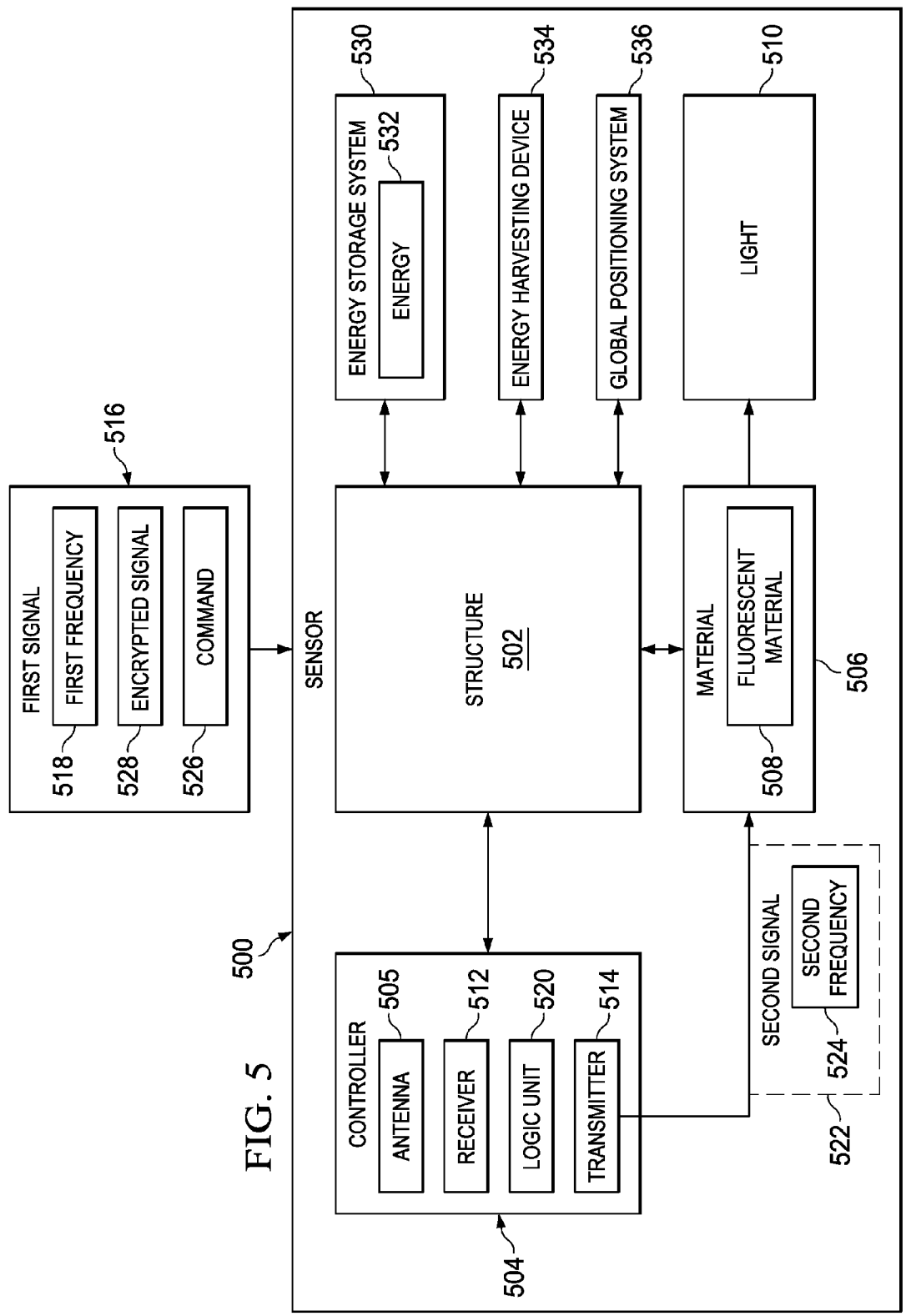
FIG. 5 is an illustration a block diagram of a sensor in accordance with an advantageous embodiment.

With reference now to FIG. 5, an illustration of a block diagram of a sensor is depicted in accordance with an advantageous embodiment. In this illustrative example, an illustration of a sensor 500 from the sensors 306 in FIG. 3 is depicted.

In this illustrative example, the sensor 500 comprises a structure 502, a controller 504, an antenna 505, and a material 506. In these illustrative examples, the material 506 is associated with the structure 502.

The association is a physical association in these depicted examples. A first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

The material 506 may be in the form of a coating on the structure 502, integrated in the structure 502, or some combination thereof.

The material 506 is a fluorescent material 508 in these illustrative examples. The material 506 is configured to generate light 510 under certain conditions. In these illustrative examples, the fluorescent material 508 may be any material that is configured to emit light 510 in response to receiving electromagnetic energy. In these illustrative examples, the wavelength of the light 510 is different from the wavelength of the electromagnetic energy. The fluorescent material 508 may include, for example, without limitation, chlorophyll, phosphor, and other suitable organic or inorganic materials.

In this illustrative example, the controller 504 includes a receiver 512 and a transmitter 514. The receiver 512 is configured to receive a first signal 516. This first signal 516 may be, for example, the signal 328 in FIG. 3. The first signal 516 has a first frequency 518. In response to receiving the first signal 516, a logic unit 520 in controller 504 determines whether to generate a second signal 522 at a second frequency 524. The logic unit may be circuits, a processor unit, and/or other conversion methodologies that enable the translation of energy into other functional capabilities or devices. In this illustrative example, the second signal 522 with the second frequency 524 is a signal that causes the material 506 to generate the light 510.

In still other illustrative embodiments, the controller 504 may take other forms in addition to and/or in place of semiconductor circuits or other metal-based circuits. For example, the controller 504 may be a physical manifestation associated with the structure 502. In other words, the controller 504 may be an organic circuit that is configured to transform energy in the first signal 516 into the second signal 522 when the first signal 516 has the correct frequency and/or code.

The antenna 505 is configured to receive the first signal 516. The antenna 505 may be implemented in a number of different ways. For example, the antenna 505 may be an electromagnetic absorbing material tuned to the particular frequency of the first signal 516. The antenna 505 may be a molecular antenna allowing for large surface area and not requiring specific antenna orientation for absorption of electromagnetic energy.

In this illustrative example, the logic unit 520 may selectively generate the second signal 522 based on the content in the first signal 516. As depicted, a command 526, for example, a selected command, may be included in the first signal 516. In this illustrative example, the logic unit 520 causes the transmitter 514 to send the second signal 522 when the command 526 is present in the first signal 516.

In some illustrative examples, the first signal 516 also may be an encrypted signal 528. Further, the encrypted signal 528 also may include the command 526. As a result, if the logic unit 520 is able to decrypt the encrypted signal 528 and the command 526 is a correct command, then the logic unit 520 causes the transmitter 514 to send the second signal 522.

Further, in these illustrative examples, the sensor 500 also may include an energy storage system 530. The energy storage system 530 is configured to store energy 532 from the first signal 516 in some instances. For example, if the first signal 516 does not include the command 526 or cannot be decrypted by the logic unit 520, then the energy 532 is stored in the energy storage system 530. In these illustrative examples, the energy storage system 530 may take a number of different forms. For example, without limitation, the energy storage system 530 may be one or more capacitors.

In still other illustrative examples, the sensor 500 also may include other active devices depending on the particular implementation. For example, the sensor 500 also may include an energy harvesting device 534. The energy harvesting device 534 may be configured to store energy 532 in energy storage system 530. In these illustrative examples, the energy harvesting device 534 may take a number of different forms. The energy harvesting device 534 may be, for example, without limitation, a solar cell, a thermoelectric generator, a micro wind turbine, and other suitable types of energy harvesting devices.

With the energy harvesting device 534, the sensor 500 may include other components that use power. For example, without limitation, the sensor 500 also may include a global positioning system 536. The global positioning system 536 is configured to generate information about a location of the sensor 500. Other components within the sensor 500 may include devices configured to identify at least one of vibration, heat, time, seismic events, acoustical events, chemicals, biological materials, and other suitable items to form the information 324 in FIG. 3.

Figure 6:
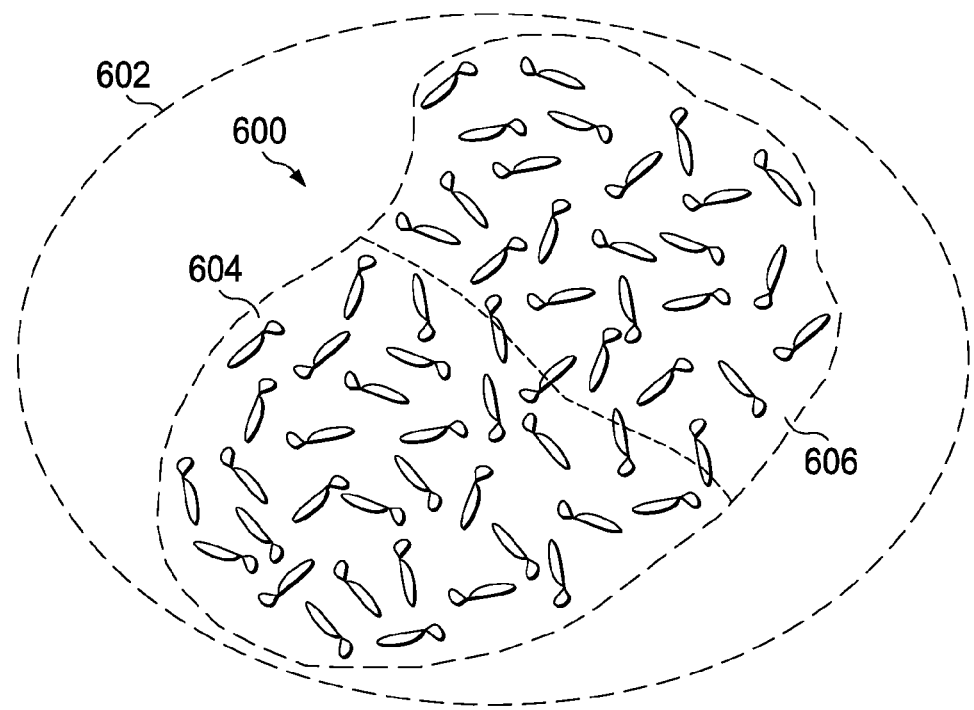
FIG. 6 is an illustration of sensors in an area in accordance with an advantageous embodiment.

Turning now to FIG. 6, an illustration of sensors in an area is depicted in accordance with an advantageous embodiment. In this illustrative example, the sensors 600 are located in an area 602. The positions of the sensors 600 may be identified after the sensors 600 have been placed in the area 602.

In the illustrative examples, the sensors 600 may be placed in the area 602 at different times. For example, a first portion 604 of the sensors 600 may be placed in the area at a first time and a second portion 606 of the sensors 600 may be placed in the area at a second time. Further, the sensors 600 may generate light at different wavelengths. For example, the first portion 604 of the sensors 600 may generate light having a first wavelength, while the second portion 606 of the sensors 600 may generate light having a second wavelength.

Further, although the first portion 604 of the sensors 600 and the second portion 606 of the sensors 600 are shown in separate parts of the area, the sensors 600 in the portions may overlap each other in the area 602. In other words, the sensors 600 in the first portion 604 and the sensors 600 in the second portion 606 may be mixed with each other within the area 602.

Figure 7:
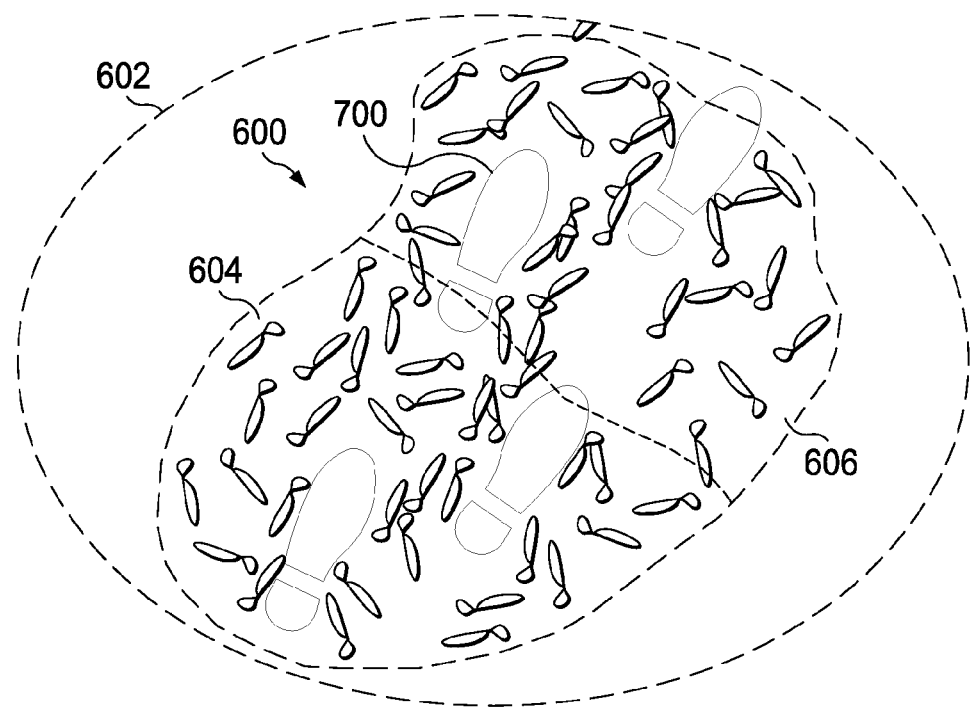
FIG. 7 is an illustration of a disturbance in the sensors in accordance with an advantageous embodiment.

Turning now to FIG. 7, an illustration of a disturbance in the sensors 600 is depicted in accordance with an advantageous embodiment. In this illustrative example, a person has walked through the area 602 as indicated by tracks 700. In these illustrative examples, the tracks 700 are shown for purposes of illustration of movement of a person through the area 602. The tracks 700, however, may not be actually seen. This movement of tracks 700, however, moved at least some of the sensors 600 such that the current positions of the sensors 600 have changed as compared to the positions of the sensors 600 in FIG. 6.

Figure 8:
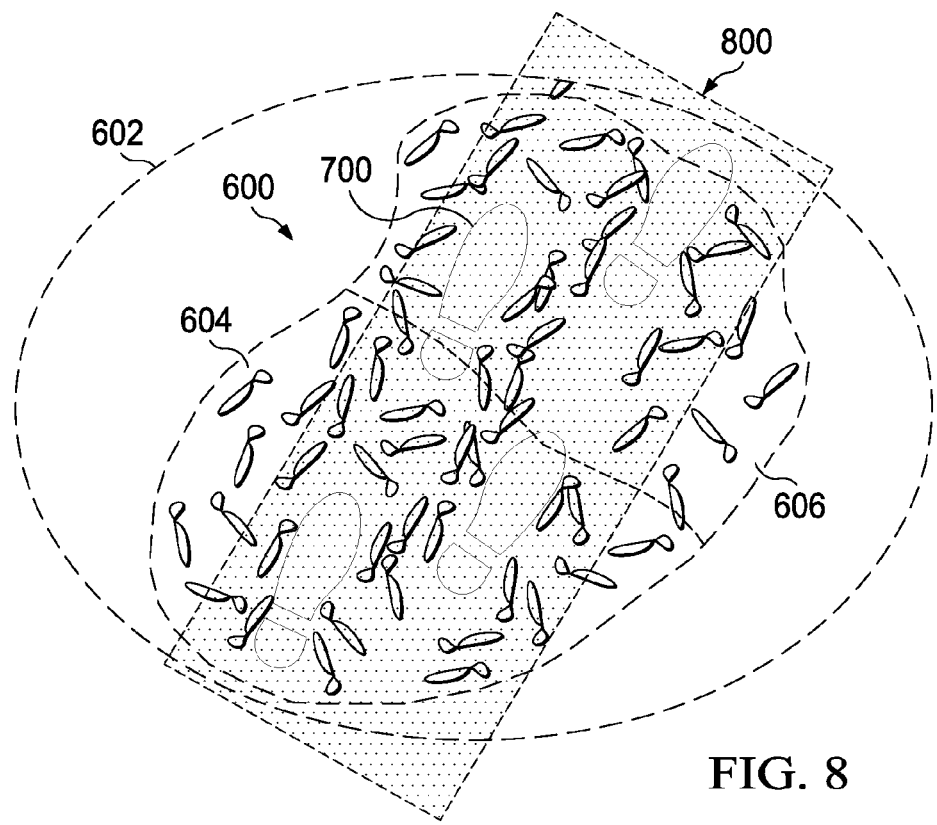
FIG. 8 is an illustration of sensors sending information in accordance with an advantageous embodiment.

Turning now to FIG. 8, an illustration of the sensors 600 sending information is depicted in accordance with an advantageous embodiment. In this illustrative example, the sensors 600 generate light 800 in response to receiving a signal. The light 800 provides information to identify the positions of the sensors 600. In these illustrative examples, the light 800 is not visible to the human eye. When the light 800 is generated by the sensors 600, this information may be detected and used to perform an analysis with the sensors 600 in their prior positions.

Figure 9:
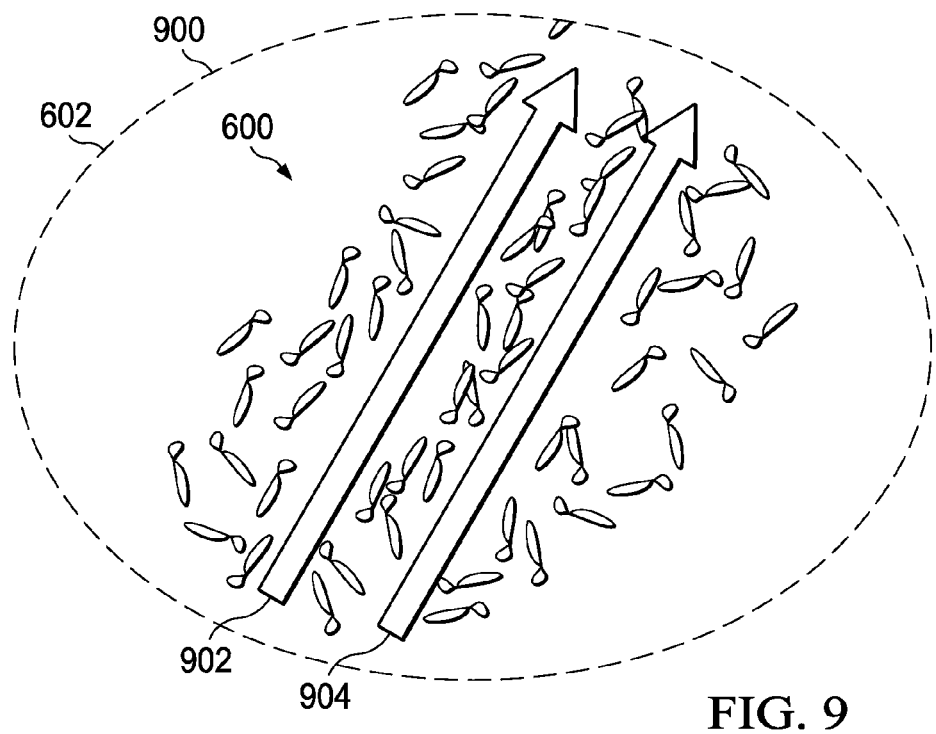
FIG. 9 is an illustration of an intrusion in accordance with an advantageous embodiment.

Turning next to FIG. 9, an illustration of an intrusion is depicted in accordance with an advantageous embodiment. In this illustrative example, an image 900 of the sensors 600 in the area 602 includes one indicator 902 and another indicator 904. These indicators indicate a direction of movement by an object in the area 602.

Figure 10:
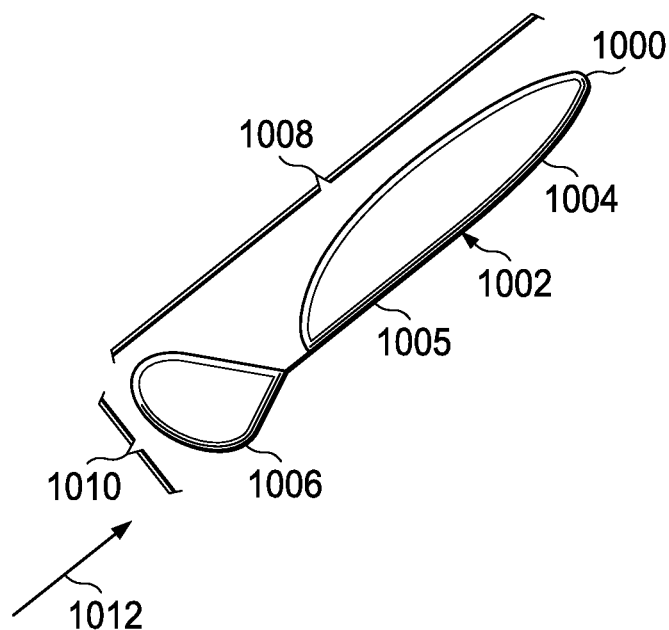
FIG. 10 is an illustration of a sensor in accordance with an advantageous embodiment.

Turning next to FIG. 10, an illustration of a sensor is depicted in accordance with an advantageous embodiment. In this illustrative example, the sensor 1000 is an example of a physical implementation for the sensor 500 shown in block form in FIG. 5. In this illustrative example, the sensor 1000 comprises a structure 1002. The structure 1002 includes a fluorescent material 1004. The fluorescent material 1004 may be a coating or may be integrated as part of the structure 1002. As depicted, the structure 1002 contains a controller 1005 and an antenna 1006.

In these illustrative examples, the sensor 1000 has a size selected to reduce the attention that may be brought to the sensor 1000 by a person moving through an area. In this illustrative example, the size of sensor 1000 may vary. For example, the sensor 1000 may have a size that is about the size of a grain of salt. In other illustrative examples, the sensor 1000 may have a size similar to a burr from a plant. For example, the length 1008 may be up to about 2 centimeters and the width 1010 may be up to about 0.25 centimeters.

The shape of the sensor 1000 may be selected to allow for the random distribution of the sensors. Also, the shape for the sensor 1000 may be selected to meet or mimic naturally occurring shapes in the environment in which they are employed. The selection of naturally occurring shapes may decrease the likelihood that the sensor 1000 is detected by a person.

In this illustrative example, the antenna 1006 is configured to receive the first signal 516 in FIG. 5. In response, the controller 1005 processes the first signal 516 and determines whether to generate the second signal 522 in FIG. 5. The second signal 522 may be transmitted by the controller 1005 to cause the material to generate light. This signal may be sent using the antenna 1006 in these illustrative examples.

In these illustrative examples, the second signal 522 comprises energy that is configured to excite the fluorescent material 1004 to cause the light to be generated. In other words, the second signal 522 may have a frequency and strength that causes the fluorescent material 1004 to generate light.

As depicted, the sensor 1000 has a shape similar to that of a maple leaf seed. In this illustrative example, the antenna 1006 may form a tail and the controller 1005 may be a head for this shape. As a result, a wind blowing in the direction of arrow 1012 results in the orientation of the sensor 1000. In other words, the antenna 1006 points in the direction of the wind in these illustrative examples. As a result, the sensor 1000 may indicate an orientation.

Figure 11:
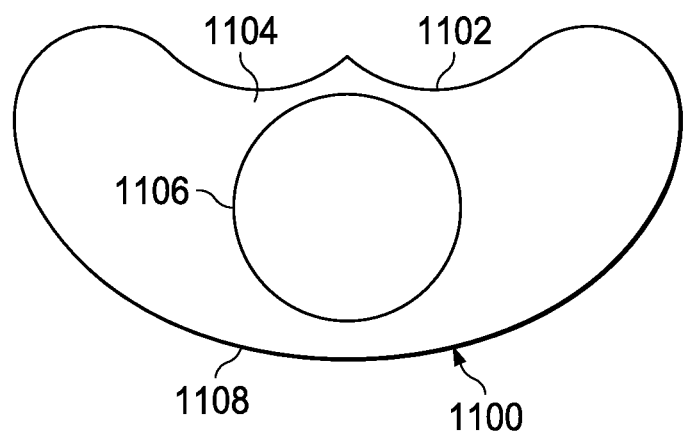
FIG. 11 is another illustration of a sensor in accordance with an advantageous embodiment.

With reference now to FIG. 11, another illustration of a sensor is depicted in accordance with an advantageous embodiment. In this illustrative example, the sensor 1100 is another example of an implementation for the sensor 500 in FIG. 5. As depicted, the sensor 1100 is comprised of a structure 1102. Material 1104 is associated with the structure 1102. The material 1104 is a fluorescent material. The material 1104 may be a coating on the structure 1102, integrated into the structure 1102, or some combination thereof.

As depicted, the structure 1102 contains a controller 1106 and an antenna 1108. The antenna 1108 is configured to receive the first signal 516 in FIG. 5. Controller 1106 is configured to process the first signal 516. The controller 1106 also is configured to generate the second signal 522 in FIG. 5. The second signal 522 causes the material 1104 to generate light in these illustrative examples.

As depicted, the sensor 1100 has a glider shape in this particular example. Of course, the illustration of the sensor 1000 in FIG. 10 and the sensor 1100 in FIG. 11 is not meant to imply limitations to the manner in which a sensor in the sensors 306 in FIG. 3 may be implemented. For example, other shapes and types of the sensors 306 may be used in addition to and/or in place of the ones illustrated in FIGS. 10 and 11.

The illustration of components in FIGS. 1, 2, and 6-11 are not meant to limit the manner in which different components in the intrusion detection environment 300 in FIG. 3 may be implemented. The different components shown in these figures may be combined with components in at least one of FIGS. 3, 4, and 5, used with components in FIGS. 3, 4, and 5, or some combination thereof. Additionally, some of the components illustrated in FIGS. 1, 2, and 6-11 may be examples of how components shown in block form in FIGS. 3, 4, and 5 may be implemented as physical structures.

Figure 12:
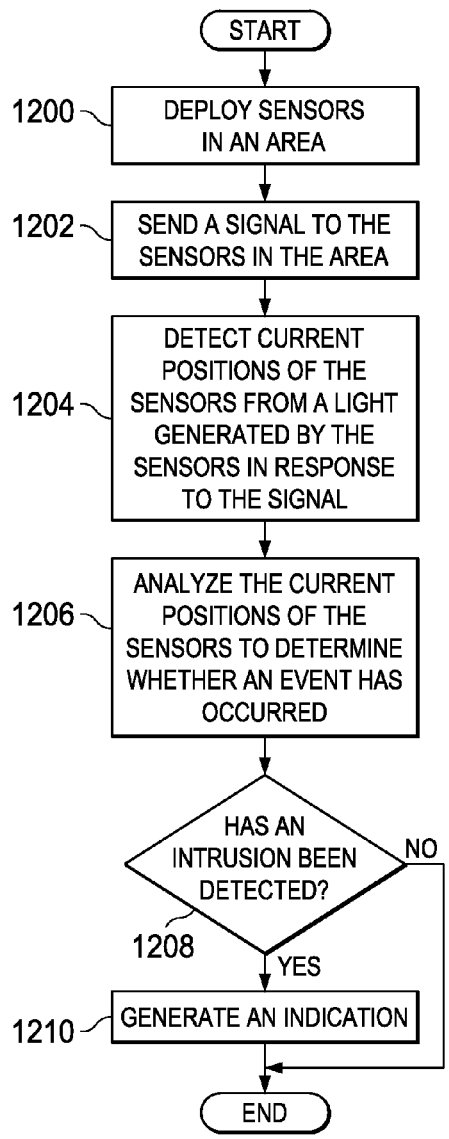
FIG. 12 is an illustration of a flowchart of a process for performing surveillance in accordance with an advantageous embodiment.

With reference now to FIG. 12, an illustration of a flowchart of a process for performing surveillance is depicted in accordance with an advantageous embodiment. The process illustrated in FIG. 12 may be implemented in the intrusion detection environment 300 in FIG. 3.

The process begins by deploying the sensors 306 in the area 302 (operation 1200). In these illustrative examples, the sensors 306 are configured to generate light 326 in response to the signal 328 to activate the sensors 306. The process sends the signal 328 to the sensors 306 in the area 302 (operation 1202). Next, the current positions 316 of the sensors 306 are detected from the light 326 generated by the sensors 306 in response to the signal 328 (operation 1204).

The process then analyzes the current positions 316 of the sensors 306 to determine whether an event 334 has occurred (operation 1206). A determination is made as to whether an intrusion has been detected (operation 1208). If an intrusion has not been detected, the process terminates. If an intrusion has been detected, the process generates an indication 338 (operation 1210). Otherwise, the process terminates.

Figure 13:
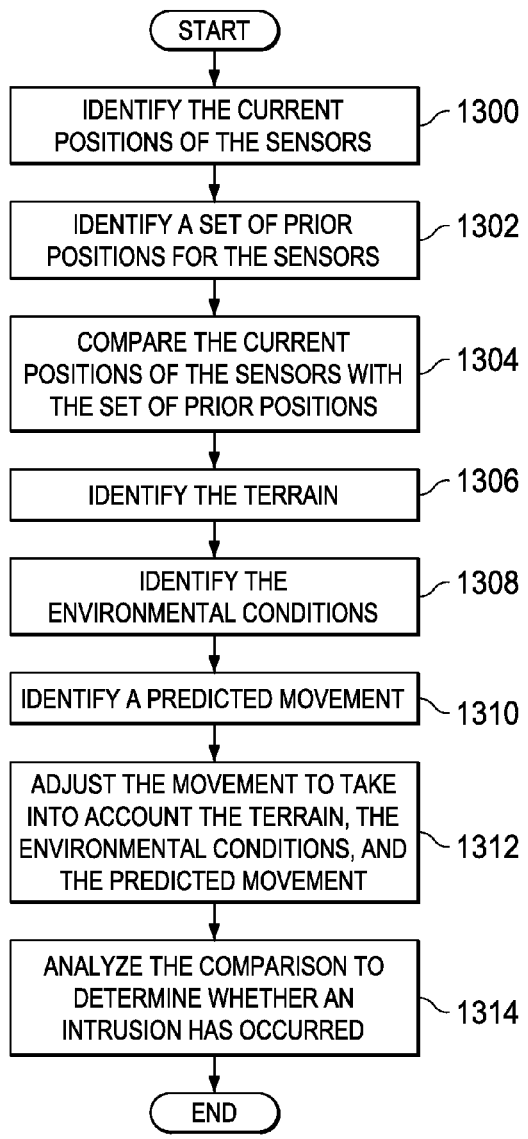
FIG. 13 is an illustration of a flowchart of a process for analyzing information collected from sensors in accordance with an advantageous embodiment.

With reference now to FIG. 13, an illustration of a flowchart of a process for analyzing information collected from sensors is depicted in accordance with an advantageous embodiment. The process illustrated in FIG. 13 may be implemented in the analysis system 312 in FIG. 4.

The process begins by identifying the current positions 316 of the sensors 306 (operation 1300). The process then identifies the set of prior positions 408 for the sensors 306 (operation 1302). A comparison 410 of the current positions 316 of the sensors 306 is made with the set of prior positions 408 (operation 1304). The comparison 410 includes the movement 422 of the sensors 306 between the current positions 316 and the set of prior positions 408.

Thereafter, the process identifies the terrain 414 (operation 1306). The process also identifies the environmental conditions 418 (operation 1308). The process also identifies a predicted movement 426 (operation 1310). The movement 422 is adjusted to take into account the terrain 414, the environmental conditions 418, and the predicted movement 426 (operation 1312).

Thereafter, the comparison 410 is analyzed to determine whether an intrusion 335 has occurred (operation 1314) with the process terminating thereafter. In these illustrative examples, the analysis system 312 takes into account different factors such as the terrain 414, the environmental conditions 418, and the predicted movement 426 to determine whether any movement 422 occurs from a source that may be considered an intrusion 335 in the area 302.

Figure 14:
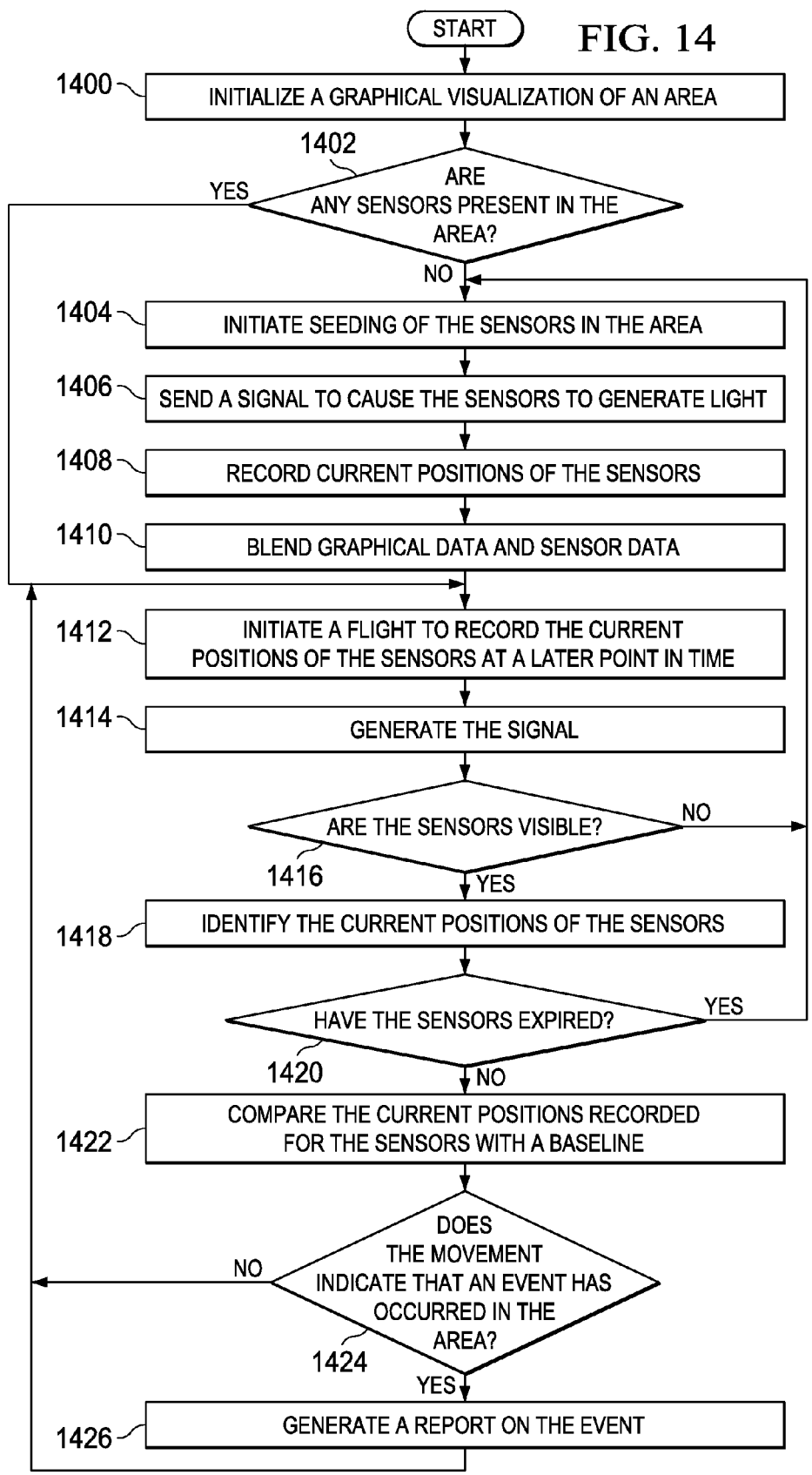
FIG. 14 is an illustration of a flowchart of a process for performing surveillance of the area in accordance with an advantageous embodiment.

Turning now to FIG. 14, an illustration of a flowchart of a process for performing surveillance of the area 302 is depicted in accordance with an advantageous embodiment. In this illustrative example, the process in FIG. 14 may be implemented in the intrusion detection environment 300 in FIG. 3.

The process begins by initializing a graphical visualization of the area 302 (operation 1400). In operation 1400, baseline analysis of the terrain is made from images taken of the terrain. These images are stored in a database such as the terrain database 416 in FIG. 4. This initialization may include information about features such as rivers, roads, pathways, and other features in the area 302. Thereafter, a determination is made as to whether any sensors 306 are present in the area 302 (operation 1402). This determination in operation 1402 may be made by determining whether the sensors 306 have been previously placed in the area 302. If the sensors 306 are not present, the process initiates seeding of the sensors 306 in the area 302 (operation 1404). The seeding involves placing the sensors 306 in the area 302. This seeding may be performed through dispersion of the sensors 306 using aerial dispersion, ground dispersion, or some combination thereof.

The process then sends a signal 328 to cause the sensors 306 to generate light 326 (operation 1406). In these illustrative examples, the signal 328 may take the form of an electromagnetic field generated by the aircraft. The process records the current positions 316 of the sensors 306 (operation 1408). In these illustrative examples, the current positions 316 of the sensors 306 may be recorded in images made of the sensors 306 or by identifying coordinates for the sensors 306. In other words, the information 324 about the sensors 306 may take the form of images, coordinates, or other types of information in which the current positions 316 for the sensors 306 can be identified.

The process then blends graphical data and sensor data (operation 1410). In operation 1410, the blending of the data may include data about the terrain generated in operation 1400 with the data obtained from the sensors 306. In operation 1408, data about the terrain may not be sent back for analysis. This reduction of the amount of data sent may reduce bandwidth usage.

Thereafter, the process initiates a flight to record the current positions 316 of the sensors 306 at a later point in time (operation 1412). The process then generates the signal 328 (operation 1414). A determination is made as to whether the sensors 306 are visible (operation 1416). This determination may be made by analyzing the image of the sensors 306 in the area 302. If the sensors 306 are not visible, the process returns to operation 1404 to initiate seeding of the sensors 306 in the area 302.

With reference again to operation 1416, if the sensors are visible, the process identifies the current positions 316 of the sensors 306 (operation 1418). Next, a determination is made as to whether the sensors have expired (operation 1420). If the sensors 306 have expired, the process also returns to operation 1404 as described above. Sensors 306 may be considered expired when they are no long able transmit light 326. The expiration of the sensor may be caused by any number of activities. These activities may be, for example, being crushed by a vehicle or stepped on by a person. The expiration of the sensor may also be data collected for analysis.

If the sensors 306 have not expired, the process compares the current positions 316 recorded for the sensors 306 with a baseline (operation 1422). In these illustrative examples, the baseline may be one or more positions of the sensors 306 from the set of prior positions 408 in the positions database 406 in FIG. 4.

A determination is made as to whether the movement 336 indicates that an event 334 has occurred in the area 302 (operation 1424). The determination in operation 1424 may be made using different analysis processes. For example, pattern recognition processes may be used to identify movement 336 in the sensors 306 that indicate unauthorized objects may have moved through the area 302. These pattern recognition processes also may take into account the movement 422 of the sensors 306 that may be caused by the environmental conditions 418 as well as the predicted movement 426 in FIG. 4 for authorized or expected objects. This event 334 indicates that an intrusion 335 may have occurred in the area 302.

If the event 334 has occurred, the process generates a report 432 on the event 334 (operation 1426) with the process then returning to operation 1412. If, in operation 1424, the event 334 has not occurred, the process also returns to operation 1412.

With reference again to operation 1402, if the sensors 306 are present in the area 302, the process proceeds to operation 1412 as described above.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 15, an illustration of a data processing system is depicted in accordance with an advantageous embodiment. The data processing system 1500 may be used to implement computers and other data processing devices used in intrusion detection environment 300 in FIG. 3. For example, the data processing system 1500 may be used to implement one or more computers in the computer system 400 in FIG. 4. In this illustrative example, the data processing system 1500 includes a communications framework 1502, which provides communications between a processor unit 1504, a memory 1506, a persistent storage 1508, a communications unit 1510, an input/output (I/O) unit 1512, and a display 1514. In these examples, the communications framework 1502 may be a bus system.

The processor unit 1504 serves to execute instructions for software that may be loaded into the memory 1506. The processor unit 1504 may be a number of processors, a multi-processor core, or some other type of processor, depending on the particular implementation.

Further, the processor unit 1504 may be implemented using a number of heterogeneous processor systems in which a main processor is present with secondary processors on a single chip. As another illustrative example, the processor unit 1504 may be a symmetric multi-processor system containing multiple processors of the same type.

The memory 1506 and the persistent storage 1508 are examples of the storage devices 1516. A storage device is any piece of hardware that is capable of storing information, such as, for example, without limitation, data, program code in functional form, and other suitable information either on a temporary basis or a permanent basis. The storage devices 1516 may also be referred to as computer readable storage devices in these examples. The memory 1506, in these examples, may be, for example, a random access memory or any other suitable volatile or non-volatile storage device. The persistent storage 1508 may take various forms, depending on the particular implementation.

For example, the persistent storage 1508 may contain one or more components or devices. For example, the persistent storage 1508 may be a hard drive, a flash memory, a rewritable optical disk, a rewritable magnetic tape, or some combination of the above. The media used by the persistent storage 1508 also may be removable. For example, a removable hard drive may be used for the persistent storage 1508.

The communications unit 1510, in these examples, provides for communications with other data processing systems or devices. In these examples, the communications unit 1510 is a network interface card. The communications unit 1510 may provide communications through the use of either or both physical and wireless communications links.

The input/output unit 1512 allows for input and output of data with other devices that may be connected to the data processing system 1500. For example, the input/output unit 1512 may provide a connection for user input through a keyboard, a mouse, and/or some other suitable input device. Further, the input/output unit 1512 may send output to a printer. The display 1514 provides a mechanism to display information to a user.

Instructions for the operating system, applications, and/or programs may be located in the storage devices 1516, which are in communication with the processor unit 1504 through the communications framework 1502. In these illustrative examples, the instructions are in a functional form on the persistent storage 1508. These instructions may be loaded into the memory 1506 for execution by the processor unit 1504. The processes of the different embodiments may be performed by the processor unit 1504 using computer implemented instructions, which may be located in a memory, such as the memory 1506.

These instructions are referred to as program code, computer usable program code, or computer readable program code that may be read and executed by a processor in the processor unit 1504. The program code in the different embodiments may be embodied on different physical or computer readable storage media, such as the memory 1506 or the persistent storage 1508.

The program code 1518 is located in a functional form on the computer readable media 1520 that is selectively removable and may be loaded onto or transferred to the data processing system 1500 for execution by the processor unit 1504. The program code 1518 and the computer readable media 1520 form the computer program product 1522 in these examples. In one example, the computer readable media 1520 may be the computer readable storage media 1524 or the computer readable signal media 1526. The computer readable storage media 1524 may include, for example, an optical or magnetic disk that is inserted or placed into a drive or other device that is part of the persistent storage 1508 for transfer onto a storage device, such as a hard drive, that is part of the persistent storage 1508. The computer readable storage media 1524 also may take the form of a persistent storage, such as a hard drive, a thumb drive, or a flash memory, that is connected to the data processing system 1500. In some instances, the computer readable storage media 1524 may not be removable from the data processing system 1500. In these examples, the computer readable storage media 1524 is a physical or tangible storage device used to store the program code 1518 rather than a medium that propagates or transmits the program code 1518. The computer readable storage media 1524 is also referred to as a computer readable tangible storage device or a computer readable physical storage device. In other words, the computer readable storage media 1524 is a media that can be touched by a person.

Alternatively, the program code 1518 may be transferred to the data processing system 1500 using the computer readable signal media 1526. The computer readable signal media 1526 may be, for example, a propagated data signal containing the program code 1518. For example, the computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, the program code 1518 may be downloaded over a network to the persistent storage 1508 from another device or data processing system through the computer readable signal media 1526 for use within the data processing system 1500. For instance, program code stored in a computer readable storage medium in a server data processing system may be downloaded over a network from the server to the data processing system 1500. The data processing system providing the program code 1518 may be a server computer, a client computer, or some other device capable of storing and transmitting the program code 1518.

The different components illustrated for the data processing system 1500 are not meant to provide architectural limitations to the manner in which different embodiments may be implemented. The different advantageous embodiments may be implemented in a data processing system including components in addition to and/or in place of those illustrated for the data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when the processor unit 1504 takes the form of a hardware unit, the processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, the program code 1518 may be omitted because the processes for the different embodiments are implemented in a hardware unit.

In still another illustrative example, the processor unit 1504 may be implemented using a combination of processors found in computers and hardware units. The processor unit 1504 may have a number of hardware units and a number of processors that are configured to run the program code 1518. With this depicted example, some of the processes may be implemented in the number of hardware units, while other processes may be implemented in the number of processors.

In this manner, the surveillance system 304 provides an improved system for identifying intrusions into the area 302 in FIG. 3. In particular, the surveillance system 304 may provide an ability to identify activities in which improvised explosive devices may be planted in the area 302. Further, the surveillance system 304 in one or more of the advantageous embodiments provides an ability to detect movement of objects. These objects may be, for example, without limitation, people, ground vehicles, and other suitable objects.

One or more of the different advantageous embodiments may use the surveillance system 304 to detect movement of people who may perform terrorist activities, movements of troops, and other suitable types of object movement. Further, the surveillance system 304 may be implemented using images that currently are generated by unmanned aerial vehicles. Through the use of the sensors 306, the information 324 may be gathered by the first platform 318 in the form of an unmanned aerial vehicle for analysis.

Further, one or more advantageous embodiments may be implemented to identify intrusions where improvised explosive devices may have been placed. Activities by unauthorized persons may cause an event 334 that indicates that a device has been buried in the ground 314 in the area 302. With the surveillance system 304, the event 334 may be detected and appropriate actions may be taken to determine whether the devices are present and to neutralize the device if needed.

Also, with the surveillance system 304, the sensors 306 may be activated from various distances. Further, the different advantageous embodiments may be used in different types of areas. For example, the area 302 may be, for example, without limitation, a field, a yard, a crossing, a road, a corridor in a building, a walkway between buildings, and other suitable locations.

Additionally, the surveillance system 304 also takes into account various conditions that may cause the movement 422 in FIG. 4 of the sensors 306. By taking into account different conditions such as the terrain 414, the environmental conditions 418, and the predicted movement 426, a more accurate analysis of whether the event 334 has occurred may be made.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for surveillance, the method comprising:
   sending a signal to sensors on a ground in an area, wherein the sensors are configured to generate electromagnetic radiation in response to the signal to activate the sensors;
   detecting current positions of the sensors from the electromagnetic radiation generated by the sensors in response to the signal;
   comparing the current positions of the sensors with a set of prior positions of the sensors to form a comparison; and
   determining whether an intrusion has occurred in the area using the comparison.

2. The method of claim 1 further comprising:
   deploying the sensors in the area.

3. The method of claim 1, wherein determining whether the intrusion has occurred in the area using the comparison comprises:
   identifying terrain in the area;
   identifying a number of environmental conditions that effect movement of the sensors; and
   determining whether the intrusion has occurred based on the terrain, the number of environmental conditions, and the comparison.

4. The method of claim 3, wherein the number of environmental conditions is selected from at least one of wind, snow, and rain.

5. The method of claim 1, wherein determining whether the intrusion has occurred in the area using the comparison comprises:
   predicting expected movement of people; and
   determining whether the intrusion has occurred in the area using the comparison and the expected movement of people or vehicles or disturbance of ground.

6. The method of claim 1, wherein the electromagnetic radiation comprises light and detecting the current positions of the sensors from the light generated by the sensors in response to the signal comprises:
   detecting the current positions of the sensors from the light generated by the sensors in response to the signal using a sensor system.

7. The method of claim 1, wherein the sensors are deployed by at least one of a number of stationary platforms and a number of mobile platforms.

8. The method of claim 1, wherein the signal is an electromagnetic frequency signal.

9. The method of claim 1, wherein the sensors are configured to blend with terrain in the area.

10. The method of claim 1, wherein the current positions comprise at least one of locations of the sensors and orientations of the sensors.

11. The method of claim 1, wherein the electromagnetic radiation is light with a wavelength that is invisible to a human eye.

12. The method of claim 1, wherein a first portion of the sensors generates the electromagnetic radiation having a first wavelength and a second portion of the sensors generates the electromagnetic radiation having a second wavelength.

13. The method of claim 12, wherein the first portion of the sensors is deployed at a first time and the second portion of the sensors is deployed at a second time.

14. The method of claim 1, wherein a sensor in the sensors has a shape and size configured to be moved in response to movement in the area by at least one of a living organism and a vehicle or a disturbance of ground.

15. The method of claim 1, wherein a sensor in the sensors is configured to move in a selected manner in response to an environmental condition.

16. The method of claim 1, wherein the signal is a second signal and wherein a sensor in the sensors is a structure associated with a material configured to generate the electromagnetic radiation using energy from a first signal at a first frequency in response to the material receiving the first signal; and
   a controller configured to receive the second signal at a second frequency and generate the first signal in response to receiving the second signal.

17. A sensor system comprising:
   a signal generator configured to generate a signal;
   sensors configured for placement on a ground in an area, wherein the sensors are configured to generate electromagnetic radiation in response to the signal;
   an information detector configured to collect information about current positions of the sensors using the electromagnetic radiation; and
   an analysis system configured to determine whether an intrusion in the area has occurred using the current positions of the sensors;
   wherein the analysis system is configured to compare the current positions of the sensors with a set of positions for the sensors.

18. The sensor system of claim 17, wherein the information detector is configured to generate images of the electromagnetic radiation.

19. The sensor system of claim 17, wherein the signal generator and the information detector are located on a mobile platform.

20. The sensor system of claim 17, wherein the signal is a second signal and wherein a sensor in the sensors is a structure associated with a material configured to generate the electromagnetic radiation using energy from a first signal at a first frequency in response to the material receiving the first signal; and
   a controller configured to receive the second signal at a second frequency and generate the first signal in response to receiving the second signal.

21. A sensor comprising:
   a structure associated with a material configured to generate electromagnetic radiation using energy from a second signal at a second frequency in response to the material receiving the second signal; and
   a controller configured to receive a first signal at a first frequency and generate the second signal in response to receiving the first signal;
   wherein the sensor is configured for placement on a ground in an area;
   wherein a current position of the sensor is configured to be detected from the electromagnetic radiation and compared to prior positions of the sensor; and
   wherein an intrusion in the area is configured to be detected using the current position.

22. The sensor of claim 21, wherein the controller is configured to generate the second signal if the first signal includes a selected command.

23. The sensor of claim 21, wherein the first signal is an encrypted signal and the controller is configured to decrypt the encrypted signal.

24. The sensor of claim 22, wherein the controller includes an energy storage system configured to store the energy from the first signal if the selected command cannot be decrypted from the first signal.

25. The sensor of claim 21, wherein the material is a coating on the structure.

26. The sensor of claim 21, wherein the material is integrated in the structure.

27. The sensor of claim 21, wherein the material is a fluorescent material.

* * * * *